United States Patent [19]
Forsberg

[11] Patent Number: 5,360,056
[45] Date of Patent: Nov. 1, 1994

[54] TEMPERATURE INITIATED PASSIVE COOLING SYSTEM

[75] Inventor: Charles W. Forsberg, Oak Ridge, Tenn.

[73] Assignee: Martin Marietta Energy Systems, Inc., Oak Ridge, Tenn.

[21] Appl. No.: 98,550

[22] Filed: Jul. 28, 1993

[51] Int. Cl.$^5$ .............................................. F28D 15/02
[52] U.S. Cl. ................................. 165/32; 165/104.19; 376/282; 376/293; 376/299
[58] Field of Search ............................ 165/32, 104.19; 376/282, 298, 299

[56] References Cited

U.S. PATENT DOCUMENTS

| | | | |
|---|---|---|---|
| 2,837,180 | 6/1958 | Armstrong | 165/104.21 |
| 3,618,854 | 11/1971 | Frank | 165/32 |
| 3,854,524 | 12/1974 | Gregorie et al. | 376/298 |
| 5,076,999 | 12/1991 | Forsberg | 376/282 |
| 5,217,682 | 6/1993 | Spinks | 376/282 |

FOREIGN PATENT DOCUMENTS 2210295  8/1990  Japan .................................. 376/282

*Primary Examiner*—Albert W. Davis, Jr.
*Attorney, Agent, or Firm*—Joseph A. Marasco; Harold W. Adams

[57] ABSTRACT

A passive cooling system for cooling an enclosure only when the enclosure temperature exceeds a maximum standby temperature comprises a passive heat transfer loop containing heat transfer fluid having a particular thermodynamic critical point temperature just above the maximum standby temperature. An upper portion of the heat transfer loop is insulated to prevent two phase operation below the maximum standby temperature.

7 Claims, 1 Drawing Sheet

TEMPERATURE INITIATED PASSIVE COOLING SYSTEM

The United States Government has rights in this invention pursuant to contract no. DEAC05-84OR21400 between the United States Department of Energy and Martin Marietta Energy Systems, Inc.

FIELD OF THE INVENTION

The present invention relates to passive cooling systems, and more particularly to passive cooling systems which rely on the thermodynamic critical point temperature of a heat transfer fluid to initiate the cooling process.

BACKGROUND OF THE INVENTION

Conventional passive cooling systems are usually based on convection flow of a fluid in a heat transfer loop, and generally operate when the temperature of an enclosure exceeds the temperature of an external heat sink to which heat is to be rejected. If it is desired that the system should stop operating when the enclosure temperature falls below the particular temperature, active devices, such as valves, motors, or operators have been required to achieve the objective.

The temperature initiated passive cooling system (TIPACS) described hereinbelow cools an enclosure whose temperature has risen above a particular temperature, rejecting the heat to an external environment; the cooling process stops when the enclosure temperature has fallen below a particular temperature. TIPACS, must, while remaining automatic and passive, requiring no valves, motors, or operators to start (initiate), operate, or stop the cooling process, be temperature initiated, operating only when the enclosure temperature exceeds a particular temperature. The particular temperature should be presetable to closely match a preferred temperature. The system must operate independently of external environment temperature; the temperature above which TIPACS operates is independent of the temperature of the external heat sink to which heat is to be rejected. The system should stop operating when the enclosure temperature falls below the particular temperature.

A cooling system having such characteristics is particularly useful for heat removal in situations where extremely high levels of reliability are desired and where overcooling must be avoided. Such situations are found in nuclear reactor systems, chemical process systems, and other heat-sensitive systems. Examples are described hereinbelow.

TIPACS can be used in multiple safety systems for nuclear reactors of all types. Two generic applications are contemplated, and can be employed together or separately.

1. TIPACS can be used for reactor containment cooling. Most modern reactors are located inside containment buildings. Containments are air-tight structures designed to prevent release of radionuclides to the environment in the event of an accident. For example, the containment building at Three Mile Island prevented the large-scale release of radioactivity during an accident in 1979, while the lack of containment building at Chernobyl resulted in the disaster at that site in 1986.

In the event of a nuclear reactor accident, large quantities of steam and/or other hot materials may be released into the containment. If the containment atmosphere is not cooled, the high temperature atmosphere will eventually destroy containment integrity and allow release of radioactivity to the environment. To prevent such a disaster, current reactor containments have active cooling systems with pumps, valves, automation equipment, etc. controlled by operators. A major safety concern is the reliability of such systems. At both the Three Mile Island and Chernobyl accidents, operator errors were deemed major contributors to the accidents.

The most advanced containments overcome some of the problems associated with active cooling systems by the use of passive cooling systems. Typical passive cooling system designs involve constructing the containment as a steel shell which can conduct heat from inside the containment through the steel and reject the heat to naturally circulating or convecting air flowing over the outside of the containment. A major problem with many passive systems is they operate continuously, and often cannot be shut off or stopped from operating when they are not needed, causing overcooling of the containment. For instance, on a cold winter day, if the power reactor is down for maintenance and not producing heat, the containment may be overcooled. Freezing water may damage equipment and make maintenance operations difficult. Blankets or other temporary devices can be used to slow natural airflow by the containment and thus help keep the containment warm, but these are not passive devices. If an accident occurred, they would have to be rapidly removed.

2. TIPACS can be used for reactor core cooling. Several advanced concepts such as Process Inherent Ultimate Safety Pressurized-Water Reactor (PIUS), Advanced Liquid Metal Reactor (ALMR), and Modular High-Temperature Gas-Cooled Reactor (MHTGR), indirectly use passive air cooling for emergency reactor core cooling to prevent core melt accidents. Because these passive air-cooling systems operate continuously, there are problems with over cooling the reactor when it is shut down on very cold days, and excess energy loss to the environment during normal power operations. Typically, about 0.5% of heat loss is due to passive cooling systems during normal operations. With a passive cooling system that operates only above a preset temperature, as described hereinbelow, these heat loses can be minimized.

TIPACS is directly applicable to the control of exothermic chemical reactions in chemical processes. In a typical exothermic chemical process, several chemicals react together to produce one or more desired products. The rate of chemical reaction is generally strongly temperature dependent. If the temperature is too low, the chemical reaction rate may be very show. If the temperature is too high, a runaway exothermic chemical reaction may occur, producing different chemical products, or, in the worst cases, destroying the process equipment and possibly the entire facility. Since TIPACS is a passive cooling system which becomes operational at a preset temperature, it provides a most suitable means for controlling chemical reactor temperatures. It provides both a safety enhancement and an economic advantage.

Historical examples demonstrate the need for TIPACS to control chemical reactor temperatures. For instance, one of the largest chemical plant disasters in history occurred at Seveso, Italy on Jul. 10, 1976. A chemical plant at Seveso used a batch chemical reactor to produce various chemicals. In the process, chemical reactants were added to a reactor tank which was heated until reactions started. The tank was then cooled, using an active cooling system, to control the chemical reaction rate until the chemical reactions were complete.

The accident occurred during a weekend shut down. A batch of chemicals had been loaded into the chemical reactor and partially reacted. Since the plant normally closed for the weekend, the chemical reactor was shut down by over cooling it until the chemical reactions stopped. The active cooling system was shut off and the workers went home. Heat leaked into the chemical reactor from some source, and the exothermic chemical reactions started again, producing added heat. A runaway exothermic chemical reaction occurred, different chemical products were produced, the pressure relief valves opened, and large quantities of dioxin were spread over the community of Seveso. If a TIPACS had been in place to cool the reactor, the accident would not have occurred.

The most common man-made chemical systems in use worldwide are electric batteries. Generally, at low temperatures, the electrical output of most batteries is low. At high temperatures, battery lifetime is limited. At very high temperatures, batteries often undergo selfdestruction, sometimes with explosive force. TIPACS creates the option to thermally insulate a battery to maintain an optimum temperature in cold weather while cooling the battery when the temperature exceeds the optimum operating temperature. Typically, rapid battery discharge or recharge increases battery temperature. This option is particularly important with advanced batteries for electric utility load leveling and for electric drive equipment and vehicles such as forklift trucks and electric cars. In automobiles equipped with internal combustion engines, battery requirements are relatively small, making it economical to oversize the batteries for cold weather. With electric vehicles, however, the cost and weight penalty of oversized batteries becomes very high. Moreover, for advanced batteries such as sodium sulfur, battery performance may require that certain minimum temperatures be maintained.

In many mechanical systems, there is need of cooling accompanied by a need to avoid overcooling. An example is the compression of gases. A gas compressor increases both the pressure and the temperature of the gas. For many applications, gas temperatures must be controlled between a minimum and a maximum. TIPACS provides such a mechanism.

An example of a specific system where TIPACS could be applied is a gaseous diffusion uranium isotope enrichment plant. A typical plant has at least 1000 uranium hexafluoride gas compressors. The gas must be cooled after leaving each compressor. If the gas is too hot, plant efficiency is reduced. If the gas is too cold, it will condense as liquid or solid. With TIPACS, an air-cooled gaseous diffusion plant is possible with no concern about over-cooled or under-cooled gases. The same concept applies to gas compressors in any process where there is an optimum gas temperature.

Another application of TIPACS is in houses and other buildings to minimize heat loss in winter, while providing summer cooling, thus replacing attic fans.

Conventional passive cooling systems comprise a single phase, natural circulation heat exchange loop which removes heat from a warmer enclosure to a cooler external environment. The heat transfer loop generally comprises a first heat exchanger inside the warmer enclosure, and a second heat exchanger in the cooler external environment. The two heat exchangers are generally interconnected with the second heat exchanger higher in elevation than the first heat exchanger.

The passive heat transfer loop being filled with a single phase fluid, heat is transferred from inside the enclosure to the external environment. The warmer enclosure heats the fluid inside the first heat exchanger. As the fluid is heated, it becomes less dense and rises, flowing to the second heat exchanger, where it is cooled as heat is rejected into the external environment. The cooling increases fluid density and the fluid flows downward back to the first heat exchanger.

The disadvantage of the conventional passive cooling system is that it operates constantly when the enclosure temperature is greater than the external environment, and an active system component is required to deactivate and reactivate the system when a desired enclosure temperature is reached.

OBJECTS OF THE INVENTION

Accordingly, it is among the objects of the present invention to provide a new and improved cooling system which automatically and passively cools an enclosure whose temperature has risen above a particular temperature, rejecting the heat to an external environment, the cooling process stopping when the enclosure temperature has fallen below a particular temperature.

Further and other objects of the present invention will become apparent from the description contained herein.

SUMMARY OF THE INVENTION

In accordance with one aspect of the present invention, the foregoing and other objects are achieved by a temperature initiated passive cooling system for removing heat from an enclosure to a heat sink which comprises a passive closed heat transfer loop including first and second heat exchangers, the first heat exchanger disposed in communication with the enclosure at a first level, and the second heat exchanger disposed in communication with the heat sink at a second level which is above the first level.

A first communicating means communicates an outlet of the first heat exchanger with an inlet of the second heat exchanger, extending to a predetermined third level which is above the second level. The first communicating means is insulated from the third level downwardly to a fourth level which is above the second level and below the third level;

A second communicating means communicates an outlet of the second heat exchanger with an inlet of the first heat exchanger.

A heat transfer fluid having a particular thermodynamic critical point temperature ($t_c$) is contained in the heat transfer loop. The heat transfer fluid exists partly as an essentially stagnant gas and partly as an essentially stagnant liquid at an enclosure temperature no higher than a maximum standby temperature, with a gas/liquid interface at a level between the third and fourth levels, minimizing heat transfer from the enclosure to the heat sink. The heat transfer fluid exists as a single phase at an enclosure temperature at least as high as the particular thermodynamic critical point temperature, with the heat transfer fluid circulating through the heat exchange loop to transfer heat from the enclosure to the heat sink.

Figure 1:
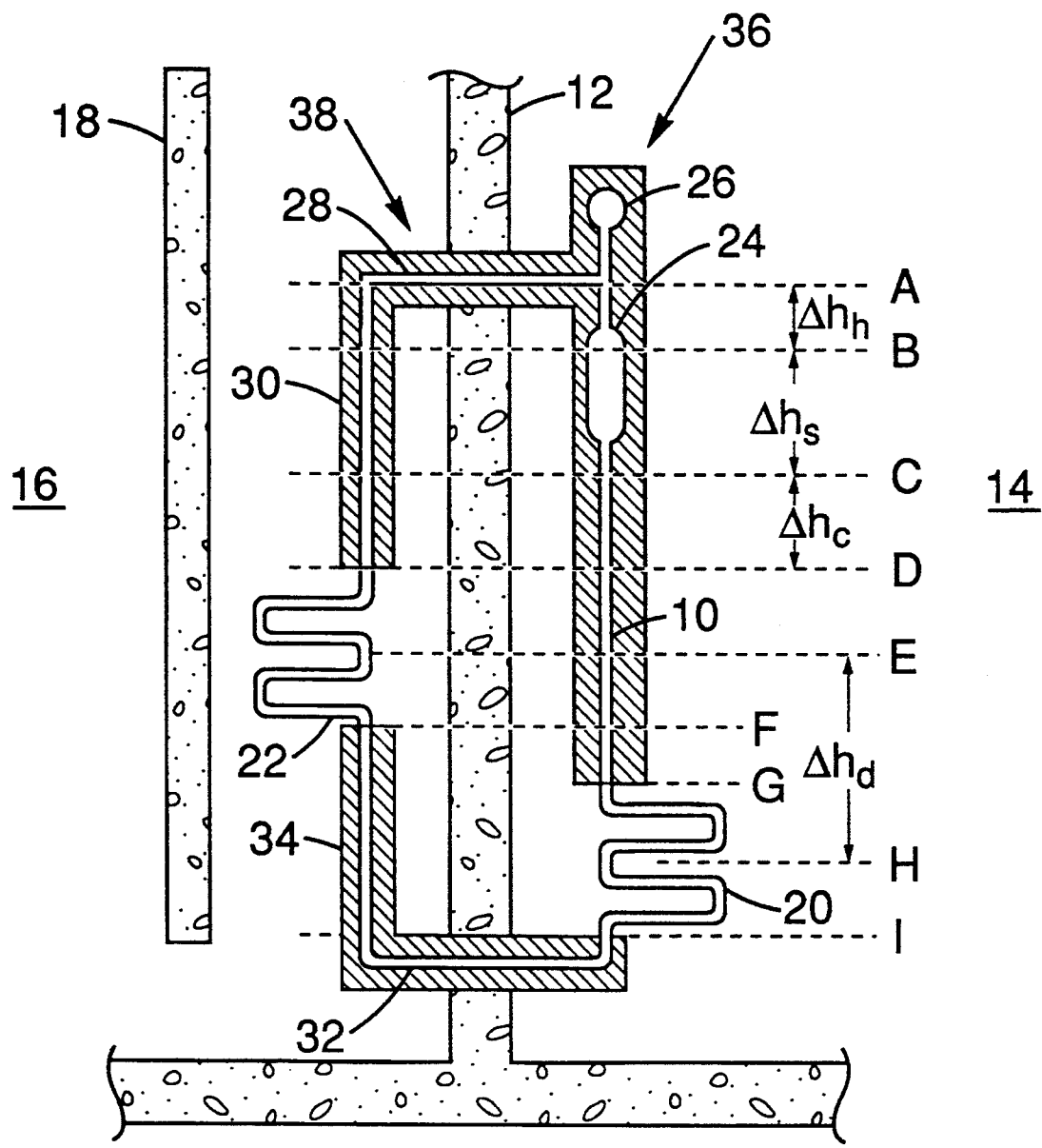
FIG. 1 is a schematic cross sectional view showing a typical TIPACS embodiment in an application where an interior space such as a containment building, chemical reactor, battery, or gas compressor is to be cooled and the heat is to be rejected to the outside air. All dimensional aspects are nominal.

For a better understanding of the present invention, together with other and further objects, advantages and capabilities thereof, reference is made to the following disclosure and appended claims in connection with the above-described drawings.

DETAILED DESCRIPTION OF THE INVENTION

TIPACS cools an enclosure whose temperature has risen above a particular temperature, rejecting the heat to an external environment; the cooling process stops when the enclosure temperature has fallen below a particular temperature. TIPACS, while having some basic structural and operational parallels with conventional heat transfer loop passive cooling systems, incorporates three distinctive, novel characteristics:

1. The system is automatic and passive, requiring no valves, motors, or operators to start (initiate), operate, or stop the cooling process.

2. The system is temperature initiated, operating only when the enclosure temperature exceeds a particular temperature. The particular temperature should be presetable to a preferred temperature or temperature range.

3. The system operates independently of heat sink temperature. The temperature above which TIPACS operates is independent of the temperature of the external heat sink to which heat is rejected, unless the heat sink becomes warmer than the enclosure.

Referring now to FIG. 1, a preferred embodiment of the invention is described as follows. TIPACS comprises a heat exchange loop 10 installed in a wall 12, bulkhead, or other structure separating a temperature controlled enclosure 14 from a heat sink 16, usually an ambient or nontemperature controlled exterior environment. The structure may include a baffle 18 to promote convection currents. TIPACS can reject heat to any available heat sink such as water, air, or even soil.

The heat exchange loop 10 comprises various components including an inside heat exchanger 20 for heat removal in the enclosure 14, an outside heat exchanger 22 for heat rejection in the heat sink 16, an in-loop reservoir 24, and an elevated blind reservoir 26.

In order to promote convectional flow of a heat transfer fluid in the proper direction, the outside heat exchanger 22 is disposed at a higher level, indicated by dashed line E, than the level of the inside heat exchanger 20, indicated by dashed line H, the difference in height being $\Delta_d$.

The heat exchange loop 10 has an upper portion 28 above the heat exchangers 20, 22 and a lower portion 32 below the heat exchangers 20, 22. The portion of the heat exchange loop 10 inside the enclosure is referred to hereinafter as a warm zone 36, and the portion of the heat exchange loop 10 in the heat sink is referred to hereinafter as a cool zone 38, even though, at times in some cases, the cool zone 38 may be warmer than the warm zone 36.

The upper portion 28 is encapsulated with an upper thermal insulation 30 above a level indicated by dashed line D, just above the outside heat exchanger 22. The lower portion 32 is encapsulated with a lower thermal insulation 34 below a level indicated by dashed line I, just below the inside heat exchanger 20. In the warm zone 36, the upper thermal insulation 30 preferably extends downwardly to a level indicated by dashed line G, just above the inside heat exchanger 20. In the cool zone 38, the lower thermal insulation 34 preferably extends upwardly to a level indicated by dashed line F, just below the outside heat exchanger 22.

FIG. 1 shows these components arranged in a particular manner in order to illustrate a basic system configuration which takes advantage of the thermodynamic critical point temperature of a particular heat transfer fluid to initiate the cooling process. The dimensional aspects of the system are nominal; in practice, the geometry can be easily adjusted in order to optimize the system for various applications.

Operation of the system is dependent upon special characteristics of a heat transfer fluid contained in the heat exchange loop 10. Given that TIPACS is to operate above a specified temperature, a fluid is chosen whose thermodynamic critical point matches a temperature above which TIPACS is to operate. The thermodynamic critical point of a pure (single substance) fluid is defined as the temperature and pressure where vapor (gas) and liquid phases have identical thermodynamic properties and the two phases become one phase. Changes in thermodynamic properties of the fluid near the thermodynamic critical point cause TIPACS to operate automatically. As examples, thermodynamic properties of carbon dioxide and water are shown in Table 1. Note that the specific liquid volumes (reciprocal density) change rapidly near the thermodynamic critical points.

TABLE 1

| Temperature °F. | Pressure lb/in² | Specific Volume Liquid ft³/lbm | Vapor ft³/lbm |
|---|---|---|---|
| Carbon dioxide | | | |
| 10 | 360.2 | .01614 | .2437 |
| 20 | 421.8 | .01663 | .2049 |
| 30 | 490.8 | .01719 | .1722 |
| 40 | 567.8 | .01787 | .1444 |
| 50 | 653.6 | .01868 | .1205 |
| 60 | 748.6 | .01970 | .0994 |
| 70 | 853.4 | .02112 | .08040 |
| 80 | 968.7 | .02370 | .06064 |
| 87.8* | 1069.4 | .03454 | .03454 |
| Water | | | |
| 620 | 1786.6 | .0247 | .2201 |
| 640 | 2059.7 | .0260 | .1798 |
| 660 | 2365.4 | .0278 | .1442 |
| 680 | 2708.1 | .0305 | .1115 |
| 700 | 3093.7 | .0369 | .0761 |
| 705.4* | 3206.2 | .0503 | .0503 |

*Thermodynamic Critical Point $t_c$

Carbon dioxide is an example of a fluid that would be used if it is desired that the temperature of the enclosure 14 is to be maintained in the range of about 90°–100° F. In one embodiment of the invention, the heat transfer loop 10 is evacuated and charged with a specific amount of essentially pure carbon dioxide, at a temperature below the thermodynamic critical point. The specific amount of the charge is chosen so that liquid carbon dioxide seeks its level in the upper portion of the loop 28 at a level within the upper thermal insulation 30 (above dashed line D) and below an overflow level, indicated by dashed line A, with gaseous carbon dioxide filling the system above the liquid. There must be sufficient fluid to form a single phase at $t_c$. There is a gas/liquid interface in each of the warm zone 36 and the cool zone 38.

Assuming that the warm zone 36, is warmer than the cool zone 38, the liquid carbon dioxide in the warm zone 36, is warmer than the liquid carbon dioxide in the cool zone 38. Therefore the liquid carbon dioxide in the warm zone 36 is less dense, resulting in different interface levels at equilibrium. For example, when the interface level in the warm zone 36 is at a level indicated by dashed line B, the interface level in the cool zone 38 may be at a level indicated by dashed line C, the difference in the liquid levels being delta height static ($\Delta h_s$).

The gas/liquid interfaces are preferably at levels within the range indicated by dashed lines B and C in order to allow for temperature fluctuations. The purpose of such interface levels is to prevent a two phase, natural circulation heat transfer process wherein liquid carbon dioxide evaporates (removing heat) in the enclosure 14 and condenses (releasing heat) in the heat sink 16.

The upper insulation 30 prevents such unwanted two phase operation and convective currents at warm zone 36 temperatures below a preselected maximum standby temperature. The lower insulation 34 prevents convective currents which could effect heat transfer at below operational temperatures.

It is preferred that the upper and lower portions 28, 32 be fully insulated, as shown in FIG. 1. The extending of the upper insulation 30 downwardly to a level indicated by dashed line G in the warm zone 36 and the extending of the lower insulation 34 upwardly to a level indicated by dashed line F in the cool zone 38 prevent convective currents which could effect reverse heat transfer in the event that the heat sink 16 became warmer than the enclosure 14.

The thermodynamic critical point temperature ($t_c$) of carbon dioxide is 87.8° F. At a maximum standby temperature, generally several degrees below the thermodynamic critical point temperature, depending on the fluid composition, amount of fluid in the system, and system geometry, the system is in standby condition and not operating because the heat transfer fluid is stagnant. For carbon dioxide the maximum standby temperature should generally be in the range of about 75°-85° F.

As the enclosure 14 temperature rises toward 87.8° F., the specific volume of liquid carbon dioxide increases rapidly. When the expanding volume of liquid carbon dioxide raises the interface level in the warm zone 36 by $\Delta h_h$ to the overflow level indicated by dashed line A, the enclosure 14 temperature has at that time exceeded the maximum standby temperature. The liquid then flows to the outside heat exchanger 22. Circulation of liquid carbon dioxide can then transfer heat from the enclosure 14 to the heat sink 16. This two-phase operation event is the preliminary, less efficient event of TIPACS operation.

When the enclosure 14 temperature reaches 87.8° F., the liquid and gaseous carbon dioxide become a single phase which ensures steady operation of the heat transfer loop. This is the main, more efficient event of TIPACS operation. In practice, these two sequential events can be made to occur over such a small temperature range as to be almost simultaneous events, or the events can be made to occur over a larger temperature range as to provide smoother operation, as is explained hereinbelow.

When the enclosure 14 temperature falls below operating temperature, the system returns to two phases, with the following events occurring thereafter. Carbon dioxide vapor in the upper portion 28, approaching equilibrium with the carbon dioxide liquid therein below, will normally undergo evaporation in the warm zone 36 and condensation in the cool zone 38 until all of the gas-filled portion of the loop 10 reaches a temperature at or near the enclosure 14 temperature. This causes warm liquid carbon dioxide to form in the loop 10 above the outside heat exchanger 22. The liquid temperature at gas-liquid interface in the insulated pipe in the cool zone 38 will approach liquid temperature inside the warm zone 36. This warm liquid carbon dioxide, with its lower density, floats on top of the cooler liquid carbon dioxide in the lower portion of the cool zone 38, forming a warm/cool liquid interface which should be at a level within the insulation 30 (above dashed line D). Heat transfer in the upper portion is then limited to heat loses through the insulation 30 and conduction at the warm/cool liquid interface.

Liquid levels in the system will fluctuate depending upon temperatures of the temperature controlled enclosure 14, the heat sink 16, and the fluid. The normal liquid level fluctuations in the loop 10 when TIPACS is not operating is preferably within $\Delta h_s$, with a buffer distance ($\Delta h_c$) between the bottom of the insulation 30 in the cool zone 38 (dashed line D) and the liquid level at dashed line C, the benefits of which are described hereinabove. By adjusting the dimensions of the system, the relative fluid volumes and liquid levels in the system can be optimized to ensure gas-liquid interfaces remain within $\Delta h_s$ over expected temperature variations below $t_c$.

Most of the TIPACS volume should be in the warm zone 36 since the fluid is the temperature sensor for starting the cooling process. Moreover, sufficient fluid expansion for operation depends upon the amount of warm fluid in the warm zone 36. Either a relatively large inside heat exchanger 20 or a liquid reservoir 24 in the warm zone 36 satisfies these requirements. A larger diameter reservoir 24 can be used in cases where a limited height of the upper region 28 is required or more desirable. In a preferred system, the liquid reservoir 24 will be nearly full near $t_c$, as shown in FIG. 1, and nearly empty at coldest design conditions.

The elevated reservoir 26 is an optional pressure damper for allowing the system to start up smoothly. Since most of the liquid expansion occurs within 10° F. of the thermodynamic critical point, the vapor can compress in the elevated reservoir 26 as the enclosure 14 temperature rises, allowing the liquid to reach the top (dashed line A), initiating the first stage of operation a few degrees before the thermodynamic critical point is reached. Since first stage operation is generally less efficient than second stage operation, a smoother initiation will be effected.

The advantages of the present invention include a unique combination of characteristics not found in conventional passive cooling systems:

1. TIPACS provides passive cooling, with no dependence on unreliable valves, motors, operators for start up, operation, or shutdown;

2. TIPACS operates only above a preset temperature or temperature range in the enclosure; and, 3. The start up of TIPACS at a preset temperature is independent over a wide range of heat sink temperatures, eliminating overcooling.

4. At and near the thermodynamic critical point temperature, small changes in temperature cause large changes in density of the fluid, inducing a high rate of convection.

5. Since viscosity of a liquid decreases as the temperature of the liquid increases, and viscosity of a gas decreases as the temperature of the gas decreases, minimum viscosity is at the thermodynamic critical point temperature, as is minimum flow resistance.

Therefore TIPACS has an advantage of maximum flow of fluid through the system.

The invention can be applied to cool any enclosure whose temperature is higher than the heat sink. There are many fluids which are suitable for use in TIPACS, each with its own critical temperature $t_c$. Choice of the proper heat transfer fluid depends on desired initiation temperature for TIPACS. Table 2 is a partial listing (taken from J. A. Dean's *Lange's Handbook of Chemistry*, Eleventh Edition, McGraw-Hill Book Company, New York) of some heat transfer fluids which are useful for various applications of the present invention. Shown in Table 2 are critical temperature ($t_c$), critical pressure ($p_c$, atm), and critical density ($d_c$, g/cm$^3$) for each listed fluid.

TABLE 2

| Substance | $t_c$, °C. | $p_c$, atm | $d_c$, g/cm$^3$ |
| --- | --- | --- | --- |
| Helium | −267.96 | 2.261 | 0.06930 |
| Neon | −228.71 | 26.86 | 0.4835 |
| Nitrogen-14 | −146.89 | 33.54 | 0.3110 |
| Air | −140.6 | 37.2 | 0.313 |
| Argon | −122.44 | 48.00 | 0.5307 |
| Oxygen | −118.38 | 50.14 | 0.419 |
| Methane | −82.60 | 45.44 | 0.162 |
| Krypton | −63.75 | 54.20 | 0.9085 |
| Perfluoromethane (tetrafluoromethane) | −45.6 | 36.9 | 0.630 |
| Silicon tetrafluoride | −14.1 | 36.7 | |
| Boron trifluoride | −12.3 | 49.2 | |
| Xenon | 16.59 | 57.62 | 1.105 |
| Perfluoroethane | 19.7 | | 0.617 |
| Trifluoromethane | 25.74 | 47.73 | 0.525 |
| 1,1-Difluoroethylene | 30.1 | 43.75 | 0.417 |
| Carbon dioxide | 31.04 | 72.85 | 0.468 |
| Ethane | 32.28 | 48.16 | 0.203 |
| Perfluoroethene (tetrafluoroethylene) | 33.3 | 38.92 | 0.58 |
| Fluoromethane | 44.55 | 58.0 | 0.300 |
| Sulfur hexafluoride | 45.55 | 37.11 | 0.734 |
| Perfluoro-n-propane | 71.9 | 26.45 | 0.628 |
| 1,1,1-Trifluoroethane | 73.1 | 37.09 | 0.434 |
| Dichlorodifluoromethane (R-12) | 111.80 | 40.71 | 0.558 |
| Perfluoro-n-butane | 113.2 | 22.93 | 0.629 |
| 1,1-Difluoroethane | 113.5 | 44.37 | 0.365 |
| Ammonia | 132.4 | 111.3 | 0.235 |
| 1,2-Dichloro-1,1,2,2-tetrafluoroethane (R-114) | 145.7 | 32.2 | 0.582 |
| Perfluoro-n-pentane | 149 | 20.1 | |
| Silicon trichlorofluoride | 165.3 | 35.3 | |
| Dichlorofluoromethane (R-21) | 178.5 | 51.0 | 0.522 |
| Perfluorocyclohexane | 184.0 | 24 | |
| Fluorotrichloromethane (R-11) | 198.0 | 43.2 | 0.554 |
| Trichlorofluoromethane | 198.0 | 43.5 | 0.554 |
| Perfluoro-n-heptane | 201.6 | 16.0 | 0.584 |
| Uranium hexafluoride | 230.2 | 45.5 | |
| Ethanol (ethyl alcohol) | 243.1 | 62.96 | 0.276 |
| Perfluoro-n-decane | 269.2 | 14.3 | |
| Bromine | 311 | 102 | 1.18 |
| Dideuterium oxide (D$_2$O) | 371.0 | 215.7 | 0.363 |
| Water | 374.2 | 218.3 | 0.325 |
| Iodine | 535 | | |
| Mercury | 900 | 180 | |

TIPACS can be easily engineered and installed in a complex industrial system, or can be built with a single bent tube and insulation for a simple or primitive application.

While there has been shown and described what are at present considered the preferred embodiments of the invention, it will be obvious to those skilled in the art that various changes and modifications can be made therein without departing from the scope of the inventions defined by the appended claims.

What is claimed is:

1. A temperature initiated passive cooling system for removing heat from an enclosure to a heat sink comprising:

a passive closed heat transfer loop comprising first and second heat exchangers, said first heat exchanger disposed in communication with said enclosure at a first level, said second heat exchanger disposed in communication with said heat sink at a second level, said second level being above said first level;

a first communicating means for communicating an outlet of said first heat exchanger with an inlet of said second heat exchanger, said first communicating means extending to a predetermined third level, said third level being above said second level, said first communicating means being insulated from said third level downwardly toward both said first heat exchanger and said second heat exchanger to a fourth level, said fourth level being above said second level and below said third level;

a second communicating means for communicating an outlet of said second heat exchanger with an inlet of said first heat exchanger; and, a heat transfer fluid contained in said heat transfer loop, said heat transfer fluid having a particular thermodynamic critical point temperature, said heat transfer fluid existing partly as an essentially stagnant gas and partly as an essentially stagnant liquid at an enclosure temperature no higher than a maximum standby temperature, said heat transfer fluid having a gas/liquid interface above each of said first heat exchanger and said second heat exchanger, each of said gas/liquid interfaces being at a level between said third and fourth levels, minimizing heat transfer from said enclosure to said heat sink, said heat transfer fluid existing as a single phase at an enclosure temperature at least as high as said particular thermodynamic critical point temperature, said heat transfer fluid circulating through said heat exchange loop to transfer heat from said enclosure to said heat sink.

2. A system as defined in claim 1 wherein said first communicating means further comprises a liquid reservoir.

3. A system as defined in claim 2 wherein said liquid reservoir is disposed within said enclosure between said third and fourth levels.

4. A system as defined in claim 1 wherein said first communicating means further comprises an elevated reservoir which extends above said third level.

5. A system as defined in claim 1 wherein said first communicating means is fully insulated.

6. A system as defined in claim I wherein said second communicating means is fully insulated.

7. A system as defined in claim I wherein both said first communicating means and said second communicating means are fully insulated.

* * * * *